(12) United States Patent
Seymour et al.

(10) Patent No.: US 8,589,045 B2
(45) Date of Patent: Nov. 19, 2013

(54) SYSTEM AND METHOD FOR DETERMINING A SAFE MAXIMUM SPEED OF A VEHICLE

(75) Inventors: Shafer Seymour, Bartlett, IL (US); David Pivonka, Winfield, IL (US)

(73) Assignee: Continental Automotive Systems, Inc, Auburn Hills, MI (US)

( * ) Notice: Subject to any disclaimer, the term of this patent is extended or adjusted under 35 U.S.C. 154(b) by 461 days.

(21) Appl. No.: 13/030,284

(22) Filed: Feb. 18, 2011

(65) Prior Publication Data

US 2012/0215412 A1 Aug. 23, 2012

(51) Int. Cl.
*B60T 8/172* (2006.01)

(52) U.S. Cl.
USPC ............ 701/70; 701/36; 701/48; 701/51; 701/65; 701/93; 701/99; 701/408; 701/412; 303/121; 303/123; 303/125; 303/132; 303/135; 303/139; 303/155; 303/166; 303/191; 303/192; 303/20; 303/28

(58) Field of Classification Search
None
See application file for complete search history.

(56) References Cited

U.S. PATENT DOCUMENTS

| | | | | |
|---|---|---|---|---|
| 5,043,896 A | * | 8/1991 | Sol | 701/80 |
| 5,744,707 A | * | 4/1998 | Kull | 73/121 |
| 5,892,437 A | * | 4/1999 | Scheibe et al. | 340/467 |
| 5,997,108 A | * | 12/1999 | Claussen et al. | 303/192 |
| 6,099,085 A | * | 8/2000 | Eckert | 303/3 |
| 6,188,316 B1 | * | 2/2001 | Matsuno et al. | 340/441 |
| 6,199,001 B1 | * | 3/2001 | Ohta et al. | 701/51 |
| 6,240,356 B1 | * | 5/2001 | Lapke | 701/93 |
| 6,249,733 B1 | * | 6/2001 | Smith | 701/50 |
| 6,299,263 B1 | * | 10/2001 | Uematsu et al. | 303/192 |
| 6,332,354 B1 | * | 12/2001 | Lalor et al. | 73/121 |
| 7,134,985 B2 | * | 11/2006 | Watanabe et al. | 477/186 |
| 7,308,352 B2 | * | 12/2007 | Wang et al. | 701/70 |
| 7,672,771 B2 | * | 3/2010 | Nakanishi et al. | 701/70 |
| 7,801,656 B2 | * | 9/2010 | Alvarez et al. | 701/70 |
| 7,835,845 B2 | * | 11/2010 | Lin | 701/70 |
| 8,014,927 B2 | * | 9/2011 | Uematsu | 701/71 |
| 8,131,431 B2 | * | 3/2012 | Sabelstrom | 701/48 |
| 8,239,078 B2 | * | 8/2012 | Siddappa et al. | 701/19 |
| 8,332,119 B2 | * | 12/2012 | Bach et al. | 701/93 |
| 8,386,144 B2 | * | 2/2013 | Jackson et al. | 701/70 |
| 8,401,753 B2 | * | 3/2013 | Chappell et al. | 701/65 |
| 2003/0036839 A1 | * | 2/2003 | Han et al. | 701/70 |

(Continued)

FOREIGN PATENT DOCUMENTS

WO 2009/010199 A1 1/2009

OTHER PUBLICATIONS

International Search Report and Written Opinion dated May 7, 2012, from corresponding International Patent Application No. PCT/US2012/023134.

*Primary Examiner* — Jonathan M Dager

(57) ABSTRACT

A system for determining a safe maximum speed of an vehicle has a processor and a global positioning system receiver in communication with the processor. The processor is configured to determine a grade and distance to an end of an upcoming or a current road segment the vehicle is traveling on based on the global positioning system information received from the global positioning system receiver. The processor is further configured to determine the safe maximum speed of the vehicle based on the distance to the end and pitch of the grade of the upcoming or current road segment the vehicle is traveling on and the braking efficiency of the vehicle.

30 Claims, 3 Drawing Sheets

(56) References Cited

U.S. PATENT DOCUMENTS

| | | | |
|---|---|---|---|
| 2005/0261818 A1* | 11/2005 | Brown et al. | 701/70 |
| 2006/0069488 A1* | 3/2006 | Sychra et al. | 701/69 |
| 2006/0113833 A1* | 6/2006 | Lingman et al. | 303/3 |
| 2006/0155447 A1* | 7/2006 | Uken et al. | 701/50 |
| 2007/0004557 A1* | 1/2007 | Steen et al. | 477/183 |
| 2007/0013228 A1* | 1/2007 | Lingman | 303/9.62 |
| 2007/0112475 A1* | 5/2007 | Koebler et al. | 701/1 |
| 2008/0086248 A1* | 4/2008 | Lu et al. | 701/41 |
| 2008/0236269 A1* | 10/2008 | Howell et al. | 73/121 |
| 2009/0234550 A1* | 9/2009 | Takeuchi et al. | 701/70 |
| 2009/0318263 A1* | 12/2009 | Yuet et al. | 477/92 |
| 2010/0174484 A1* | 7/2010 | Sivasubramaniam et al. | 701/213 |
| 2011/0054768 A1* | 3/2011 | Sullivan | 701/123 |
| 2011/0098922 A1* | 4/2011 | Ibrahim | 701/208 |
| 2011/0313647 A1* | 12/2011 | Koebler et al. | 701/123 |
| 2012/0089313 A1* | 4/2012 | Frashure et al. | 701/94 |

\* cited by examiner

SYSTEM AND METHOD FOR DETERMINING A SAFE MAXIMUM SPEED OF A VEHICLE

BACKGROUND

1. Field of the Invention

The invention generally relates to systems and methods for vehicle accident avoidance.

2. Description of Related Art

Vehicles have a variety of systems for slowing down the speed of the vehicle. Vehicles can be slowed down through the use of vehicle brakes which can be either drum style brakes, disc brakes, or other types of brakes that slow down the vehicle. Additionally, the vehicle can be slowed down through adjustments to the vehicles powertrain. These adjustments can include changing the gear selection of the transmission and/or the throttle position of the vehicle.

However, there are certain situations where a vehicle, such as a tractor trailer, is traveling down a stretch of road having a very steep grade. This steep grade alone will affect the vehicle's ability to slow down. Further, large vehicles, such as tractor trailers, have significant weight loads making it even more difficult for these types of vehicles to affectively slow down on any grade of road.

In order to avoid a situation where the vehicle cannot be slowed down to safely travel down a stretch of road, the driver must skillfully determine the appropriate speed to travel down the stretch of road. However, drivers are prone to error and it is very common for drivers to miscalculate the safe maximum speed for the vehicle to travel down a stretch of road. This miscalculation can eventually lead to an unsafe situation, potentially causing harm to the driver and possibly other motorists.

SUMMARY

A system and method for determining a safe maximum speed of a vehicle includes a processor and a global positioning system receiver in communication with the processor. The global positioning system receiver has an antenna for receiving global positioning system signals. Additionally, the processor is in communication with a brake temperature sensor, a wheel speed sensor and a grade angle sensor.

The processor is configured to determine a grade and a distance to an end of an upcoming or a current road segment the vehicle is traveling on based on the global positioning system information received from the global positioning system receiver. Further, the processor is configured to determine the safe maximum speed of the vehicle based the grade and the distance to the end of the upcoming or current road segment the vehicle is traveling on and the braking efficiency of the vehicle. The braking efficiency of the vehicle may be based on grade angle of the road the vehicle is on, the wheel speed of at least one wheel of the vehicle and/or the brake temperature of at least one brake of the vehicle.

Further objects, features and advantages of this invention will become readily apparent to persons skilled in the art after a review of the following description, with reference to the drawings and claims that are appended to and form a part of this specification.

DETAILED DESCRIPTION

Figure 1:
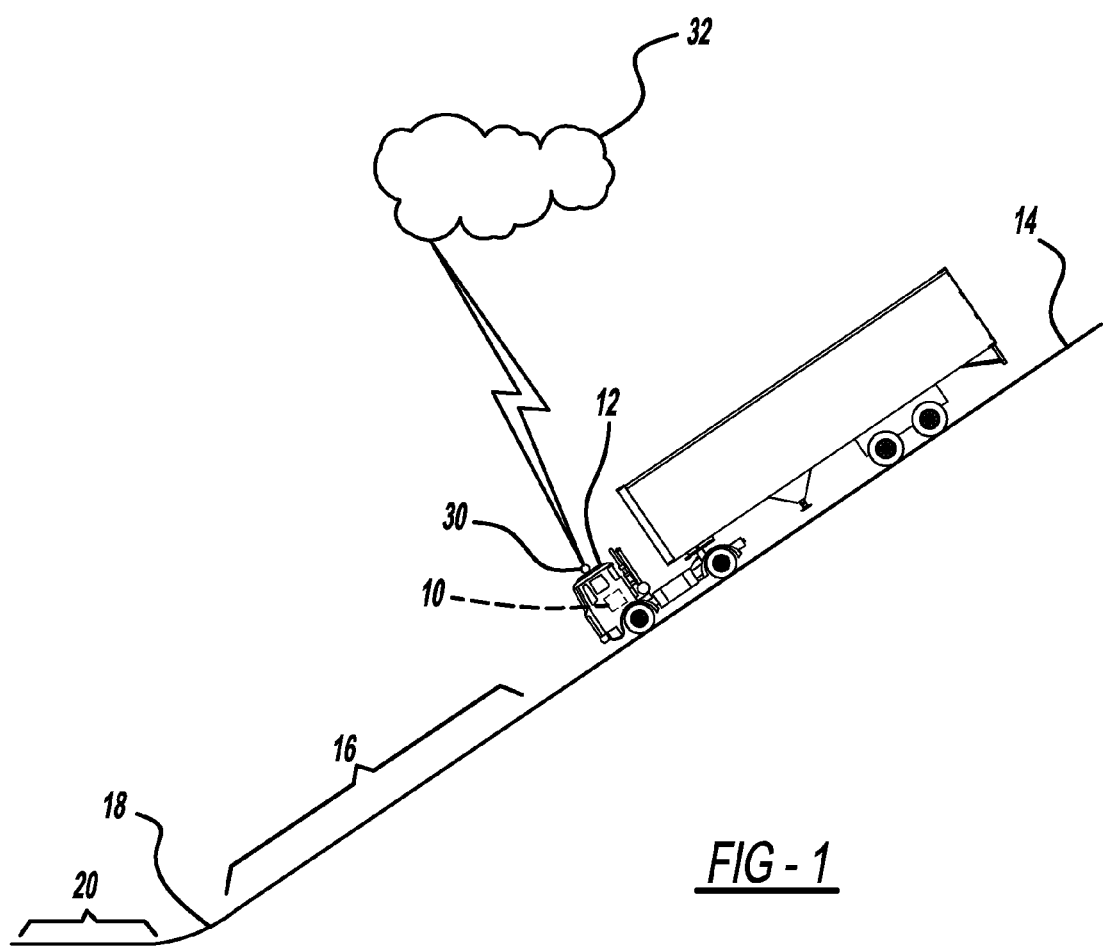
FIG. 1 illustrates a system for determining a safe maximum speed of an vehicle travelling along a stretch of road.

Referring to FIG. 1, a system 10 for determining a safe maximum speed of a vehicle 12 is shown. Generally, the system 10 may be coupled to the vehicle 12. The vehicle 12 can be a variety of different types of vehicles. For example, the vehicle 12 may be a car, a sport utility vehicle, a tractor trailer, or any other vehicle capable of traveling on a flat surface, such as a road.

Here, the vehicle 12 is a tractor trailer. The vehicle 12 is traveling down a road 14 comprised of road segments, such as road segment 16. The road segment 16 has an end 18. Additionally, it can be seen that the road segment 16 has a pitch or grade in relation to a second road segment 20.

Figure 2:
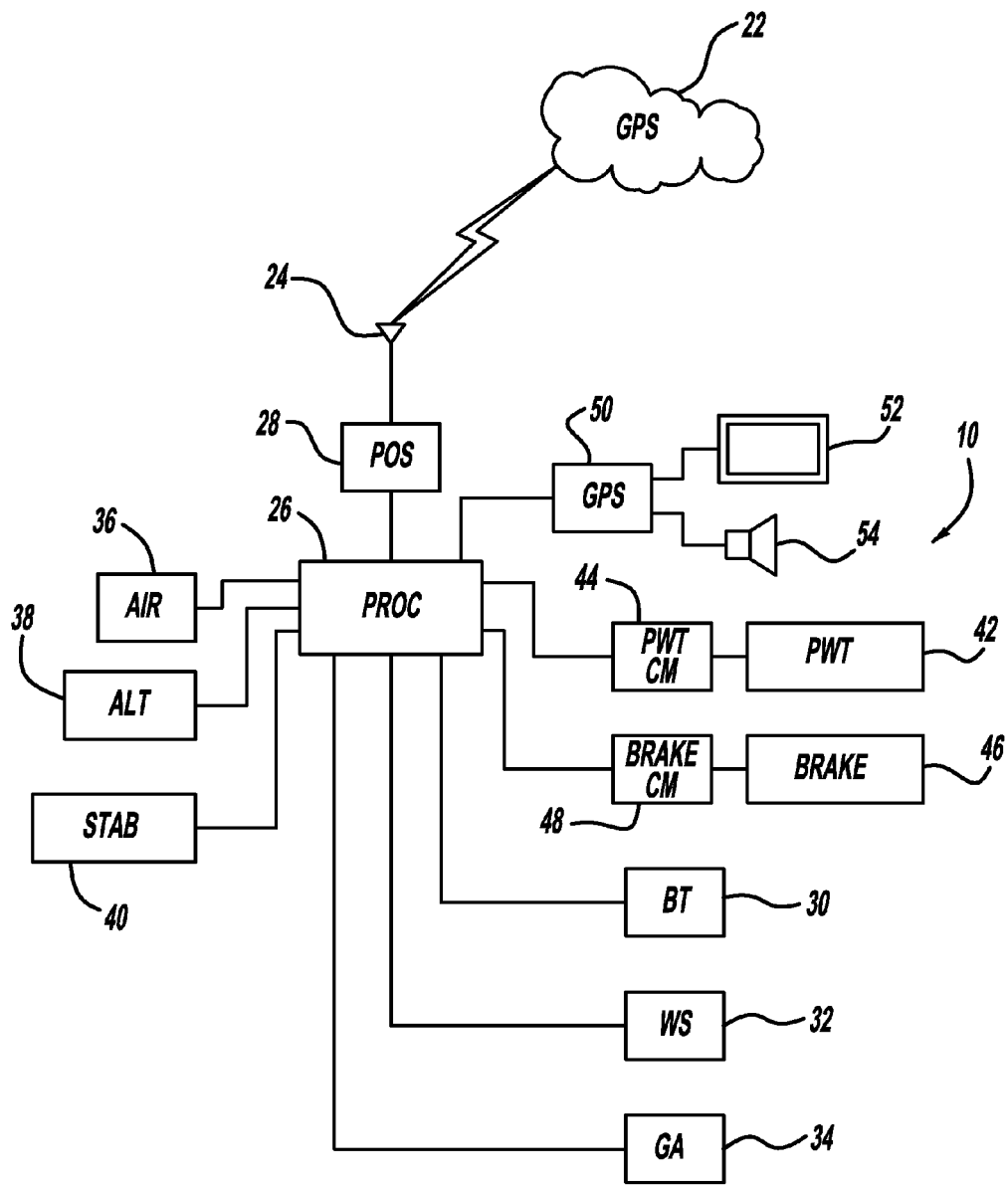
FIG. 2 illustrates in greater detail the system for determining the safe maximum speed of the vehicle of FIG. 1.

Referring to FIG. 2, a more detailed illustration of the system for determining a safe maximum speed of a vehicle 12 is shown. The system 10 includes a processor 26. The processor 26 may be in communication with a positioning system 28. The positioning system 28 may be in communication with the antenna 24 which receives signals from the global positioning satellite system 22. By so doing, the positioning system 28 can determine the location of the vehicle and report this information to the processor 26. Additionally, the positioning system 28 may have one or more map databases allowing for the positioning system 28 to determine a route for the vehicle and further allows the positioning system 28 to determine what road segments the vehicle is traveling on or will be traveling on.

The processor 26 may also in communication with a brake temperature sensor 30, a wheel speed sensor 32, and a grade angle sensor 34. The brake temperature sensor 30 is configured to monitor the brake temperature of at least one brake of the vehicle. The wheel speed sensor is configured to determine the wheel speed of at least one wheel of the vehicle. Finally, the grade angle sensor 34 is configured to determine the grade angle of the road. Using signals received from the brake temperature sensor 30, the wheel speed sensor 32 and the grade angle sensor 34, the processor 26 may determine the braking efficiency of the vehicle.

The processor 26 may also determine how certain environmental factors can affect the vehicle's ability to brake using environmental sensors. These environmental sensors include an air temperature sensor 36, an altitude sensor 38, and a stability control sensor 40. The air temperature sensor 36 determines the air temperature outside the vehicle. The altitude sensor 38 determines the altitude of the vehicle. Finally, the stability control sensor 40 can determine the stability of the vehicle and any tilting and/or swaying the vehicle may be experiencing.

The processor 26 may also in communication with the powertrain 42 of the vehicle via a powertrain controller 44. The powertrain controller 44 allows the processor 26 to adjust the gear selection and throttle position of the powertrain 42 of the vehicle. Additionally, the processor 26 may also in communication with the brake system 46 via a brake control module 48. By so doing, the processor 26 can engage the braking system 46 of the vehicle 12.

The system 10 also includes an output device 50 in communication with the processor 26. The output device 50 may also include a display 52 and a speaker 54. The display 52 and speaker 54 can then output both visual and audio instructions to a driver of the vehicle regarding what the safe maximum speed of the vehicle should be.

Figure 3:
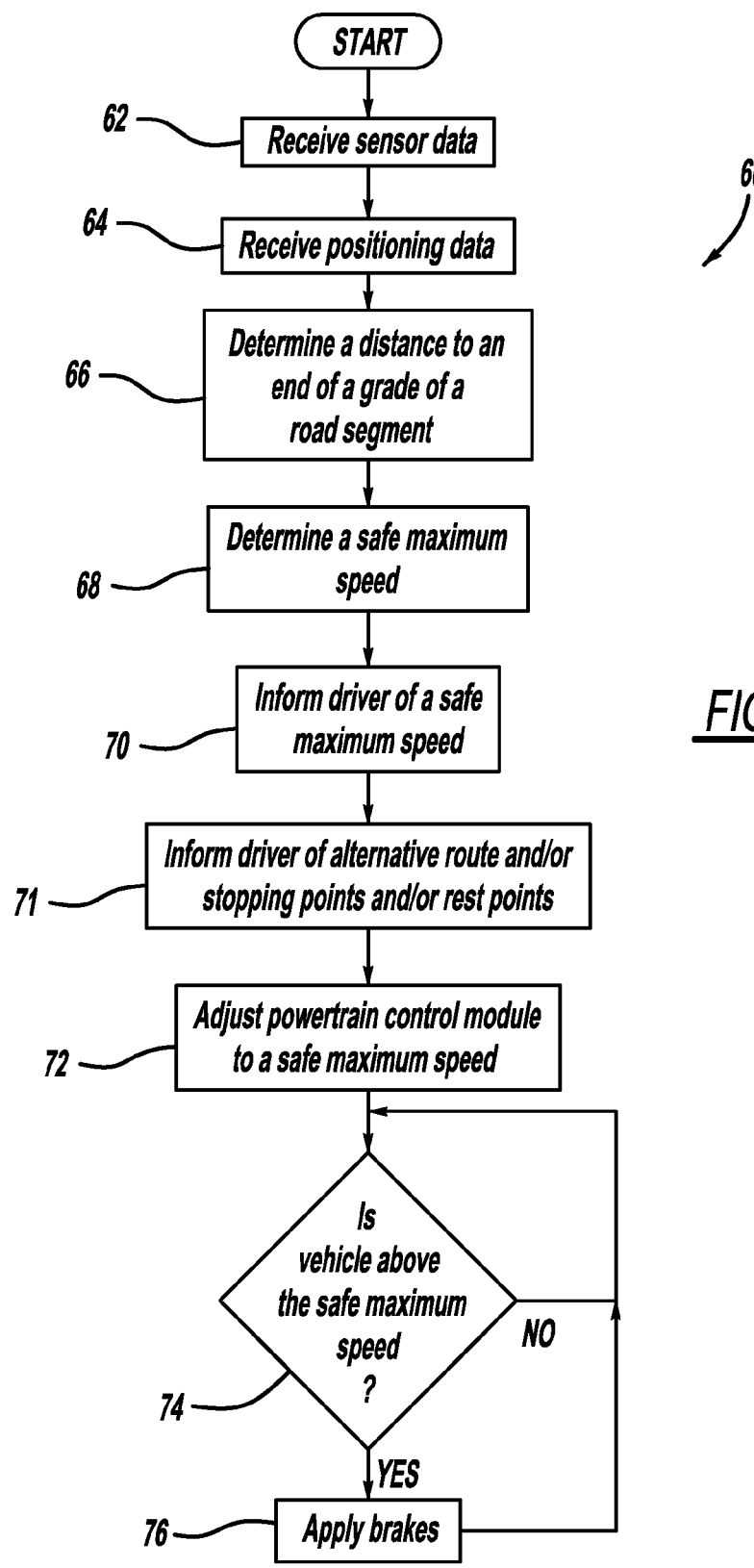
FIG. 3 illustrates a method for determining the safe maximum speed of the vehicle of FIG. 1.

Referring to FIG. 3, a method 60 for determining a safe maximum speed of a vehicle is shown. In addition to FIG. 3, reference will be made to FIGS. 1 and 2. The method 60 begins with step 62, wherein the processor 26 receives sensor data. Generally, this sensor data includes information from the brake temperature sensor 30, wheel speed sensor 32 and grade angle sensor 34. Additionally, the processor 26 may also receive environmental factors affecting the vehicle, such as information from the air temperature sensor 36, altitude sensor 38, and stability control sensor 40. In step 64, the processor 26 receives positioning data from the positioning system 28. The positioning data may include the location of the vehicle, and any road segments the vehicle is traveling on or will be traveling on. In step 66, the processor 26 determines a distance to an end of a grade of a road segment that the vehicle 10 is or will be traveling on. For example, in FIG. 1, the processor 26 can determine the length of the road segment 16 to an end 18. Additionally, the processor 26 can determine the grade of the road segment 16.

In step 68 the processor 26 may be configured to determine a safe maximum speed for the vehicle. This determination may be made based on the distance to an end and grade of the upcoming or current road segment that the vehicle is traveling on and the braking efficiency of the vehicle. The braking efficiency of the vehicle may be determined by using information provided by the brake temperature sensor 30, the wheel speed sensor 32, and the grade angle sensor 34. As stated before, these sensors provide the processor 26 information relating to the brake temperature of the brake of the vehicle, the wheel speed of at least one wheel of the vehicle and the grade angle of the road.

Over time, the processor 26 develops a vehicle-specific model of braking characteristics. The vehicle-specific model of braking characteristics may include how the brakes fade as they heat and maneuverability models for the vehicle 12 taking into account the vehicle's current load size and distribution.

Additionally, the processor 26 may use environmental factors affecting the vehicle in determining the safe maximum speed for the vehicle to be traveling on a current or upcoming road segment. These environmental factors may include the outside air temperature, the road condition, and the altitude of the vehicle.

Finally, in determining the safe maximum speed of the vehicle, the processor 26 may also use vehicle specification data relating to the vehicle. This data can include dimensional information regarding the vehicle, such as the weight of the vehicle, the load distribution of the vehicle, and other dimensional data.

The safe maximum speed of the vehicle is a speed determined by the processor 26 that will allow the driver to maintain full control of the vehicle when traveling on a current or upcoming road segment. In some situations, the processor 26 may determine that an upcoming road segment has too steep a grade over too long a distance, such that the driver will not be able to maintain full control of the vehicle over these segments. The processor 26 may look at potential grade issues, not just on the current segment of road, but also upcoming road segments along the whole route.

In step 70, the processor 26 may inform the driver of the vehicle of the safe maximum speed that the vehicle should be traveling. This may be done by having the processor utilize the output system 50 and output either visual or audio information to the driver via the display 52 and/or the speaker 54. By informing the driver of the safe maximum speed and/or adjusting the powertrain settings and/or braking of the vehicle, the driver will be able to accurately predict what speed the driver should drive the vehicle to prevent any unsafe situations.

Additionally, in step 71, the driver may be informed that upcoming road segments that the vehicle will be traveling down cannot be safely travelled. In that situation, the positioning system 28 could provide information to the driver via the output system 50, such as an alternative route to take to avoid any dangerous situations or stopping and/or rest points along the route the driver should utilize in order to reduce the probability of brake failure. Effectively, the processor 26 is able to determine a driving strategy for the entire trip.

In step 72, the processor 26 may adjust the powertrain control module 44 of the vehicle so that the vehicle will not travel faster than the safe maximum speed. The powertrain control module 44 may adjust the powertrain settings of the vehicle, such as the gear selection and throttle position of the powertrain system 42.

In step 74, a determination is made by the processor 26 if the vehicle is traveling above a safe maximum speed. If the vehicle is not traveling above a safe maximum speed, the method 60 returns back to step 74. Otherwise, the method 60 proceeds to step 76 wherein the brakes of the vehicle are applied by the processor 26 via the brake control module 48.

Additionally or alternatively, in step 76, application or the brakes may be activating engine braking of the powertrain 42 of the vehicle 10. Engine braking is the opening of exhaust valves in the cylinders of the engine, releasing the compressed air trapped in the cylinders, and slowing the vehicle 12. When the powertrain control module 44 adjusts the settings of the powertrain 42 and releases the accelerator on a moving vehicle 12 powered by a diesel engine, the vehicle's forward inertia continues to turn the engine's crankshaft, drawing air into the cylinders as the pistons move down and compressing that air as the pistons move back up. The pressure of the compressed air pushes back on the up-going piston, tending to slow the vehicle 12.

With a gasoline engine, the mechanics are different and a special valve is not necessary for engine braking to happen when the powertrain control module 44 adjusts the settings of the powertrain 42 and releases the accelerator. In the gasoline engine, with the accelerator released, a throttle prevents the free flow of air into the cylinders, so there is little pressure to release at the top of the compression stroke. The throttle itself provides engine braking through friction in the air flowing through it.

While the above description constitutes the preferred embodiment of the present invention, it will be appreciated that the invention is susceptible to modification, variation, and change without departing from the proper scope and fair meaning of the accompanying claims.

In other embodiments, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of the invention. This description is not intended to limit the scope or application of the invention in that the invention is susceptible to modification, variation and change, without departing from spirit of the invention, as defined in the following claims.

We claim:

1. A method for determining a safe maximum speed of a vehicle, the method comprising the steps of:
    measuring the braking efficiency of the vehicle;
    collecting global positioning system information;
    determining a distance to an end and a pitch of a grade of an upcoming or a current road segment the vehicle is traveling on based on the global positioning system information; and
    determining the safe maximum speed of the vehicle based on the distance to the end and grade of the upcoming or current road segment on which the vehicle is traveling and the braking efficiency of the vehicle.

2. The method of claim 1, wherein the step of measuring the braking efficiency of the vehicle further comprises the step of determining a brake temperature of at least one brake.

3. The method of claim 2, wherein the step of measuring the braking efficiency of the vehicle further comprises the step of determining a wheel speed of the vehicle.

4. The method of claim 3, wherein the step of measuring the braking efficiency of the vehicle further comprises the step of determining a grade angle of a road the vehicle is on.

5. The method of claim 1, further comprising the steps of:
    determining environmental factors affecting the vehicle, wherein the environmental factors include at least one of outside air temperature, road condition, and altitude of the vehicle; and
    determining the safe maximum speed of the vehicle based on the environmental factors affecting the vehicle.

6. The method of claim 1, further comprising the steps of:
    receiving active stability control data of the vehicle; and
    determining the safe maximum speed of the vehicle based on the active stability control data of the vehicle.

7. The method of claim 1, further comprising the steps of:
    receiving vehicle specification data of the vehicle, wherein the vehicle specification data includes at least one of weight of the vehicle and load distribution of the vehicle; and
    determining the safe maximum speed of the vehicle based on the vehicle specification data.

8. The method of claim 1, further comprising the step of informing a driver of the safe maximum speed of the vehicle.

9. The method of claim 1, further comprising the step of setting the maximum speed the vehicle can travel by adjusting the vehicle powertrain settings.

10. The method of claim 9, wherein the vehicle powertrain settings include at least one of gear selection and throttle position.

11. The method of claim 1, further comprising the step of applying at least one brake of the vehicle when the vehicle exceeds the safe maximum speed.

12. The method of claim 1, further comprising the step of applying engine braking of the vehicle when the vehicle exceeds the safe maximum speed.

13. The method of claim 1, further comprising the step of informing a driver of an alternative route or stopping points or rest points along a route.

14. The method of claim 1, further comprising the step developing a vehicle specific model of braking characteristics of the vehicle for developing a route strategy.

15. The method of claim 1, wherein the upcoming or current road segment on which the vehicle is traveling further comprises an entire route which the vehicle is traveling.

16. A system for determining a safe maximum speed of an vehicle, the system comprising:
    a processor;
    a global positioning system receiver in communication with the processor, the global positioning system receiver having an antenna for receiving global positioning system signals;
    wherein the processor is configured to determine a distance to an end and grade of an upcoming or a current road segment the vehicle is traveling on based on the global positioning system information received from the global positioning system receiver;
    wherein the processor is configured to determine the safe maximum speed of the vehicle based on the distance to the end and pitch of the grade of the upcoming or current road segment the vehicle is traveling on and the braking efficiency of the vehicle.

17. The system of claim 16, further comprising
    a brake temperature sensor in communication with the processor for determining a brake temperature of at least one brake of the vehicle; and
    wherein safe maximum speed of the vehicle is based on the brake temperature of at least one brake of the vehicle.

18. The system of claim 17, further comprising:
    a wheel speed sensor in communication with the processor for determining a wheel speed of at least one wheel of the vehicle; and
    wherein the safe maximum speed of the vehicle is based on a wheel speed of at least one wheel of the vehicle.

19. The system of claim 17, further comprising:
    a grade angle sensor in communication with the processor for determining a grade angle of a road the vehicle is on; and
    wherein the safe maximum speed of the vehicle is based on the grade angle of a road the vehicle is on.

20. The system of claim 16, further comprising:
    an ambient air temperature sensor in communication with the processor for determining the ambient air temperature; and
    wherein the safe maximum speed of the vehicle is based on the ambient air temperature.

21. The system of claim 16, further comprising:
    an altitude sensor in communication with the processor for determining the altitude of the vehicle; and
    wherein the safe maximum speed of the vehicle is based on the altitude of the vehicle.

22. The system of claim 16, further comprising:
a stability control sensor in communication with the processor for determining the stability of the vehicle; and
wherein the safe maximum speed of the vehicle is based on the stability of the vehicle.

23. The system of claim 16, wherein the safe maximum speed of the vehicle is based on the vehicle specification data of the vehicle, wherein the vehicle specification data includes at least one of weight of the vehicle and load distribution of the vehicle.

24. The system of claim 16, further comprising:
an output device in communication with the processor and located in the occupant compartment of the vehicle;
wherein the processor is configured to inform a driver of the safe maximum speed of the vehicle via the output device, an alternative route or stopping points or rest points along a route; and
wherein the output device is a vehicle navigation unit having a display area and an audio output device.

25. The system of claim 16, further comprising:
a powertrain control module in communication with the processor for adjusting the powertrain settings of the vehicle;
wherein the processor is configured to set the maximum speed the vehicle can travel by adjusting the vehicle powertrain settings via the powertrain control module; and
wherein the vehicle powertrain settings include at least one of gear selection and throttle position.

26. The system of claim 16, further comprising:
a braking control module in communication with the processor for controlling the at least one brake of the vehicle; and
the processor being configured to apply the at least of brake of the vehicle via the brake control module when the vehicle exceeds the safe maximum speed.

27. The system of claim 16, further comprising:
a powertrain control module in communication with the processor for adjusting the powertrain settings of the vehicle;
wherein the processor is configured to set the maximum speed the vehicle can travel by adjusting the vehicle powertrain settings via the powertrain control module; and
wherein the vehicle powertrain settings includes applying engine braking of the vehicle when the vehicle exceeds the safe maximum speed.

28. The system of claim 16, wherein the processor is further configured to develop a vehicle specific model of braking characteristics of the vehicle for developing a route strategy.

29. The method of claim 1, wherein the upcoming or current road segment on which the vehicle is traveling further comprises an entire route which the vehicle is traveling.

30. In a computer readable storage medium having stored therein instructions executable by a programmed processor for determining a safe maximum speed of a vehicle, the storage medium comprising instructions for:
measuring the braking efficiency of the vehicle;
collecting global positioning system information;
determining a distance to an end and a pitch of a grade of an upcoming or a current road segment the vehicle is traveling on based on the global positioning system information; and
determining the safe maximum speed of the vehicle based on the distance to the end and grade of the upcoming or current road segment on which the vehicle is traveling and the braking efficiency of the vehicle.

* * * * *